Patented Dec. 14, 1926.

1,610,391

UNITED STATES PATENT OFFICE.

THORN SMITH, OF DETROIT, MICHIGAN, ASSIGNOR TO PARKE, DAVIS & COMPANY, OF DETROIT, MICHIGAN, A CORPORATION OF MICHIGAN.

COMPOUND OF SILVER IODIDE AND PROTEIN SUBSTANCES.

No Drawing. Application filed September 27, 1920, Serial No. 413,160. Renewed May 17, 1926.

The invention relates to a new series of compounds composed of silver iodide and various protein substances as bases. These compounds are in solid form, soluble in water and yield solutions of silver iodide, partly or all, in the colloidal form. They can be prepared from various protein substances, as gelatin, albumen, etc. and contain various amounts of silver iodide. They are usually light yellowish in color, soluble in water, insoluble in alcohol, ether, benzol and petroleum benzene. The solution in water appears whitish or milky in a reflected light and semi-transparent in a direct light. On standing part of the silver iodide may gradually collect and settle to the bottom or it may practically all remain in solution as colloidal silver iodide for several days.

These compounds may be prepared as follows:

Any aqueous solution of colloidal silver with an oxidized protein base can be treated with iodine which will react with the colloidal silver forming colloidal silver iodide. If this solution contains sufficient protein base to prevent the silver iodide from precipitating, it is evaporated to dryness, preferably at a low temperature and in a vacuum. If the solution does not contain sufficient protein base, more soluble protein base is added and the solution evaporated to dryness, preferably at a low temperature and in a vacuum.

As a concrete example for making one of these compounds, 20 grams of the compound commercially known as "argyrol" is dissolved in 80 cubic centimeters of water and 6 grams of powdered iodine is added. The mixture is agitated until the black color of the solution disappears and the solution becomes light colored. The undissolved iodine is allowed to settle and the clear solution decanted, filtered, and evaporated to dryness at a low temperature and preferably in a vacuum. In place of evaporating the above solutions to dryness they can be dehydrated by precipitating the concentrated solutions with alcohol or acetone and drying the resultant precipitate. In place of argyrol any compound containing colloidal silver in combination with an oxidized protein base may be used; for example, the commercial product known as "silvol," which is a very quickly soluble colloidal silver compound containing about twenty percent (20%) colloidal silver with an oxidized protein base.

A solution of colloidal silver can be prepared by heating or boiling a strongly alkaline solution of a protein with freshly precipitated silver oxide until the solution has turned black, then cooling and neutralizing the excess alkali with an acid. Freshly precipitated silver oxide can be made by treating a solution of silver nitrate with the equivalent amount of a solution of sodium hydroxide and washing the resultant precipitate with water by decantation. To vary the content of silver iodide in these compounds, the solution of colloidal silver iodide may be diluted with a soluble protein before evaporating to dryness. This also helps to retain the silver iodide in the colloidal form. In place of powdered iodine, iodine in any solid form of compound or in solution may be used.

A more specific method of preparing the compound is as follows:

Solution A.

5 grams ground gelatine.
4.5 cc. sodium hydroxide solution 4%.
20 cc. water.

Mix and heat to boiling for 3 to 5 minutes. Cool partly and filter with suction with aid of a little infusorial earth. Wash filter with 5 to 10 cc. of water. To the solution add .6 gram of powdered benzoic acid.

Solution B.

41 grams ground gelatine.
80 cc. sodium hydroxide solution 4%.
80 cc. water.

Mix well and heat gently to boiling, keeping well stirred. Boil gently for 40 minutes, cool partly and filter with suction with aid of infusorial earth. (Will have about 40 grams of gelatine in solution as about 1 gram is precipitate.)

Solution C.

Dissolve 15.7 grams of silver nitrate in 200 cc. of water. Add 97 cc. of solution sodium hydroxide 4%. Mix well and allow to settle. Decant supernatant liquid carefully and wash precipitate twice by decantation with 300 cc. of water to remove sodium nitrate. Remove as much water as possible by decantation of the last wash. The precipitate of silver oxide settles quickly and there is but little loss.

*Solution D.*

Add B to C and, after thoroughly shaking, heat gently to boiling, keeping well agitated all the time. Continue the boiling until the gray solution has become jet black. Do not boil too long, but the silver oxide must all be reduced to colloidal silver. Cool to about 25 degrees cent. and add solution A. Add 7 cc. of N/ acetic acid and mix well.

*Solution E.*

Powder 13 grams of iodine in a mortar large enough to hold Solution D. Add Solution D to the iodine and continue to powder the iodine by gentle rotation of the pestle until the black color of the solution becomes gray. Near the end the solution may become blue but this still contains collodial silver. (The black colloidal silver combines with the iodine as it dissolves and forms colloidal silver iodide.) As soon as practically all of the silver has reacted with the iodine decant the solution from the small amount of iodine which remains undissolved. If not stopped at the proper time the reaction may go too far and the solution becomes red from dissolved iodine. Solution E will become some lighter in color after being decanted from the iodine.

Now neutralize Solution E carefully with N/ acetic acid, add 1 cc. at a time until one or two drops of Solution E added to a drop of phenolphthalien solution in two or three cc. of water in a test tube does not show more than a faint pink color. All of this should not require more than 2 or 3 cc. of N/ acetic acid.

Filter Solution E through a suction filter with the aid of infusorial earth; it must be clear. Evaporate this filtrate to dryness in enameled ware trays in a vacuum drier. Put up in air tight amber botles.

The new compound should dissolve in water, forming a celar solution which appears white in reflected light. It should react neutral or very slightly alkaline to phenolphthalien. It should contain about 30% of silver iodide. This can of course be changed by altering the amount of silver nitrate employed, or by the amount of soluble proteid used for diluting (Solution A).

The theoretical yield is about 70 grams. Solution E measures about 250 cc. and contains 21 grams of colloidal silver iodide in solution. Solution E should not be allowed to stand but should be evaporated as soon as it is filtered. The new product has strong germicidal properties. It dissolves readily in water, forming a white solution of silver iodide. Viewed through a direct light, the diluted solution is perfectly clear and transparent. The silver iodide is so finely divided that it is in the molecular or colloidal state and does not settle out for a long time. In this form the silver iodide is much more penetrating on mucous surfaces. It will not precipitate or react with albumen like silver nitrate. The colloidal silver iodide is white instead of black and therefore the solution does not stain black, it is not irritating to mucous surfaces, and may be used without irritation in treating the eye or nose, and the solution is nearly tasteless, which is advantageous in mouth and throat work.

The term "soluble protein" as herein used is meant to include any protein which is soluble in itself or which has been made soluble by treatment with alkalis or acids, or digested ferments and acids, or which has been rendered soluble by hydrolysis.

What I claim as my invention is:

1. A new body composed of silver iodide and an oxidized protein substance which is soluble in cold water and has strong germicidal properties.

2. A new body composed of silver iodide and oxidized protein substance and an additional protecting colloid, which body is soluble in cold water and has strong germicidal properties.

3. A new body composed of silver iodide and oxidized protein substance and an unoxidized protein substance, which body is soluble in cold water and has strong germicidal properties.

4. The method of forming a colloidal silver iodide compound, which consists in first forming a colloidal solution of metallic silver and an oxidized protein substance, and treating the same with iodine.

5. The method of forming colloidal silver iodide compound, which consists in treating freshly precipitated silver oxide with a solution of soluble protein to reduce the oxide to metallic silver and to oxidize the protein, and in then treating with iodine.

6. The method of forming colloidal silver iodide compound, which consists in treating freshly precipitated silver oxide with a solution of soluble gelatine, boiling the resulting mixture until the silver oxide is reduced to metallic silver and the soluble gelatine is oxidized, thereby forming colloidal silver in oxidized gelatine, and in then treating with iodine.

7. The method of forming colloidal silver iodide compound, which consists in first forming a colloidal solution of metallic silver and an oxidized protein substance, in treating with iodine and in adding a solution of soluble protein as a further protecting colloid.

8. The method of forming colloidal silver iodide compound, which consists in first forming a colloidal solution of metallic silver and an oxidized protein substance, in separately treating gelatine with a solution of alkaline hydroxide, boiling the resulting mixture, neutralizing with an acid, in adding this compound to the colloidal silver solution to form an additional protecting colloid therefor, and in treating the colloidal silver with iodine either before or subsequent to the addition of the protecting colloid.

9. The method of forming solid colloidal silver iodide compound, which consists in forming a colloidal solution of metallic silver and an oxidized protein substance, treating with iodine and evaporating to dryness.

10. The method of forming solid colloidal silver iodide compound, which consists in forming a colloidal solution of metallic silver and an oxidized protein substance, treating with iodine, adding a further protecting colloid and evaporating to dryness.

In testimony whereof I affix my signature.

THORN SMITH.